(12) United States Patent
Beekman et al.

(10) Patent No.: US 12,491,355 B2
(45) Date of Patent: Dec. 9, 2025

(54) PERCUTANEOUS CIRCULATORY SUPPORT DEVICE INCLUDING PROXIMAL PRESSURE SENSOR

(71) Applicant: Boston Scientific Scimed Inc., Maple Grove, MN (US)

(72) Inventors: Darrin Dale Beekman, Osseo, MN (US); Lloyd Radman, Blaine, MN (US); Brett Struthers, Victoria, MN (US); Maren Landree, Medina, MN (US)

(73) Assignee: Boston Scientific Scimed Inc., Maple Grove, MN (US)

( * ) Notice: Subject to any disclaimer, the term of this patent is extended or adjusted under 35 U.S.C. 154(b) by 462 days.

(21) Appl. No.: 17/988,164

(22) Filed: Nov. 16, 2022

(65) Prior Publication Data

US 2023/0149699 A1     May 18, 2023

Related U.S. Application Data

(60) Provisional application No. 63/390,054, filed on Jul. 18, 2022, provisional application No. 63/279,941, filed on Nov. 16, 2021.

(51) Int. Cl.
*A61M 60/414*     (2021.01)
*A61M 60/13*      (2021.01)

(52) U.S. Cl.
CPC .......... *A61M 60/414* (2021.01); *A61M 60/13* (2021.01)

(58) Field of Classification Search
CPC .. A61M 60/414; A61M 60/13; A61M 60/221; A61M 60/419; A61M 60/531; A61M 60/816; A61M 2205/3331; A61B 2562/0247; A61B 5/6852; A61B 5/0215
See application file for complete search history.

(56) References Cited

U.S. PATENT DOCUMENTS

| | | |
|---|---|---|
| 4,957,504 A | 9/1990 | Chardack |
| 5,527,159 A | 6/1996 | Bozeman, Jr. et al. |
| 5,692,882 A | 12/1997 | Bozeman, Jr. et al. |
| 5,947,892 A | 9/1999 | Benkowski et al. |
| 5,964,694 A | 10/1999 | Siess et al. |

(Continued)

FOREIGN PATENT DOCUMENTS

| | | |
|---|---|---|
| EP | 0847767 B1 | 2/2005 |
| EP | 2301598 B1 | 7/2017 |

(Continued)

OTHER PUBLICATIONS

International Search Report and Written Opinion for International Application No. PCT/US2022/0500059, dated Apr. 14, 2023. (23 pages).

*Primary Examiner* — Paula J Stice
(74) *Attorney, Agent, or Firm* — Seager, Tufte & Wickhem LLP

(57) ABSTRACT

A percutaneous circulatory support device includes a housing and an impeller disposed within the housing. The impeller is configured to rotate relative to the housing to cause blood to flow through the housing. A motor is operably coupled to the impeller, and the motor is configured to rotate the impeller relative to the housing. A catheter is coupled to the motor, and a pressure sensor is coupled to the catheter and disposed proximally relative to the housing.

13 Claims, 5 Drawing Sheets

(56) References Cited

U.S. PATENT DOCUMENTS

| | | | |
|---|---|---|---|
| 6,007,478 A | 12/1999 | Siess et al. | |
| 6,135,729 A | 10/2000 | Aber | |
| 6,139,487 A | 10/2000 | Siess | |
| 6,176,822 B1 | 1/2001 | Nix et al. | |
| 6,176,848 B1 | 1/2001 | Rau et al. | |
| 7,010,954 B2 | 3/2006 | Siess et al. | |
| 7,841,976 B2 | 11/2010 | McBride et al. | |
| 7,927,068 B2 | 4/2011 | McBride et al. | |
| 7,972,122 B2 | 7/2011 | LaRose et al. | |
| 8,376,707 B2 | 2/2013 | McBride et al. | |
| 8,591,393 B2 | 11/2013 | Walters et al. | |
| 8,597,170 B2 | 12/2013 | Walters et al. | |
| 8,617,239 B2 | 12/2013 | Reitan | |
| 8,684,904 B2 | 4/2014 | Campbell et al. | |
| 8,721,517 B2 | 5/2014 | Zeng et al. | |
| 8,992,163 B2 | 3/2015 | McBride et al. | |
| 9,072,825 B2 | 7/2015 | Pfeffer et al. | |
| 9,138,518 B2 | 9/2015 | Campbell et al. | |
| 9,162,017 B2 | 10/2015 | Evans et al. | |
| 9,308,302 B2 | 4/2016 | Zeng | |
| 9,308,304 B2 | 4/2016 | Peters et al. | |
| 9,327,067 B2 | 5/2016 | Zeng et al. | |
| 9,364,592 B2 | 6/2016 | McBride et al. | |
| 9,364,593 B2 | 6/2016 | McBride et al. | |
| 9,381,288 B2 | 7/2016 | Schenck et al. | |
| 9,421,311 B2 | 8/2016 | Tanner et al. | |
| 9,446,179 B2 | 9/2016 | Keenan et al. | |
| 9,474,840 B2 | 10/2016 | Siess | |
| 9,607,007 B2 | 3/2017 | Bakke et al. | |
| 9,669,142 B2 * | 6/2017 | Spanier | A61M 60/531 |
| 9,675,740 B2 | 6/2017 | Zeng et al. | |
| 9,717,833 B2 | 8/2017 | McBride et al. | |
| 9,770,543 B2 | 9/2017 | Tanner et al. | |
| 9,872,947 B2 | 1/2018 | Keenan et al. | |
| 9,895,476 B2 | 2/2018 | LaRose et al. | |
| 9,907,890 B2 | 3/2018 | Muller | |
| 9,956,332 B2 | 5/2018 | LaRose et al. | |
| 9,962,475 B2 | 5/2018 | Campbell et al. | |
| 9,964,115 B2 | 5/2018 | Scheckel | |
| 10,029,037 B2 | 7/2018 | Muller et al. | |
| 10,039,872 B2 | 8/2018 | Zeng et al. | |
| 10,071,192 B2 | 9/2018 | Zeng | |
| 10,086,121 B2 | 10/2018 | Fitzgerald et al. | |
| 10,105,475 B2 | 10/2018 | Muller | |
| 10,117,980 B2 | 11/2018 | Keenan et al. | |
| 10,149,932 B2 | 12/2018 | McBride et al. | |
| 10,215,187 B2 | 2/2019 | McBride et al. | |
| 10,232,099 B2 | 3/2019 | Peters et al. | |
| 10,251,985 B2 | 4/2019 | Larose et al. | |
| 10,251,986 B2 | 4/2019 | Larose et al. | |
| 10,478,539 B2 | 11/2019 | Pfeffer et al. | |
| 10,478,540 B2 | 11/2019 | Scheckel et al. | |
| 10,525,178 B2 | 1/2020 | Zeng | |
| 10,576,192 B2 | 3/2020 | Muller et al. | |
| 10,576,193 B2 | 3/2020 | Tanner et al. | |
| 10,709,829 B2 | 7/2020 | Muller | |
| 10,709,830 B2 | 7/2020 | Tanner et al. | |
| 10,765,789 B2 | 9/2020 | Zeng et al. | |
| 10,765,791 B2 | 9/2020 | Moyer et al. | |
| 10,780,208 B2 | 9/2020 | Siess et al. | |
| 10,786,610 B2 | 9/2020 | Zeng | |
| 10,799,624 B2 | 10/2020 | Pfeffer et al. | |
| 10,842,921 B2 | 11/2020 | Siess et al. | |
| 10,864,308 B2 | 12/2020 | Muller et al. | |
| 10,864,309 B2 | 12/2020 | McBride et al. | |
| 10,874,783 B2 | 12/2020 | Pfeffer et al. | |
| 10,894,115 B2 | 1/2021 | Pfeffer et al. | |
| 10,918,774 B2 | 2/2021 | Stanfield et al. | |
| 10,960,116 B2 | 3/2021 | Campbell et al. | |
| 10,960,118 B2 | 3/2021 | Sunagawa | |
| 10,980,927 B2 | 4/2021 | Pfeffer et al. | |
| 11,027,114 B2 | 6/2021 | D'Ambrosio et al. | |
| 11,033,727 B2 | 6/2021 | Tuval et al. | |
| 11,058,865 B2 | 7/2021 | Fitzgerald et al. | |
| 11,123,539 B2 | 9/2021 | Pfeffer et al. | |
| 11,129,978 B2 | 9/2021 | Pfeffer et al. | |
| 11,167,124 B2 | 11/2021 | Pfeffer et al. | |
| 11,185,677 B2 | 11/2021 | Salahieh et al. | |
| 11,229,786 B2 | 1/2022 | Zeng et al. | |
| 11,235,138 B2 | 2/2022 | Gross-Hardt et al. | |
| 11,253,693 B2 | 2/2022 | Pfeffer et al. | |
| 11,260,213 B2 | 3/2022 | Zeng et al. | |
| 11,273,301 B2 | 3/2022 | Pfeffer et al. | |
| 11,311,712 B2 | 4/2022 | Zeng et al. | |
| 11,338,124 B2 | 5/2022 | Pfeffer et al. | |
| 11,357,967 B2 | 6/2022 | Zeng et al. | |
| 11,400,276 B2 | 8/2022 | Chopra et al. | |
| 11,497,896 B2 | 11/2022 | Tanner et al. | |
| 11,517,736 B2 | 12/2022 | Earles et al. | |
| 11,529,062 B2 | 12/2022 | Moyer et al. | |
| 11,583,659 B2 | 2/2023 | Pfeffer et al. | |
| 11,628,294 B2 | 4/2023 | Chopra et al. | |
| 11,708,833 B2 | 7/2023 | McBride et al. | |
| 11,754,075 B2 | 9/2023 | Schuelke et al. | |
| 11,786,700 B2 | 10/2023 | Pfeffer et al. | |
| 2004/0191116 A1 | 9/2004 | Jarvik et al. | |
| 2005/0267322 A1 | 12/2005 | LaRose et al. | |
| 2008/0114339 A1 | 5/2008 | McBride et al. | |
| 2009/0060743 A1 | 3/2009 | McBride et al. | |
| 2011/0190610 A1 * | 8/2011 | Kuhn | A61B 5/14532 29/592.1 |
| 2015/0290372 A1 | 10/2015 | Muller et al. | |
| 2017/0055908 A1 | 3/2017 | Radman et al. | |
| 2017/0128646 A1 | 5/2017 | Karch | |
| 2017/0296725 A1 | 10/2017 | Peters et al. | |
| 2018/0303990 A1 | 10/2018 | Siess et al. | |
| 2018/0311423 A1 | 11/2018 | Zeng et al. | |
| 2018/0353667 A1 * | 12/2018 | Moyer | A61M 60/585 |
| 2019/0053714 A1 | 2/2019 | Guelen et al. | |
| 2020/0023110 A1 * | 1/2020 | Jahangir | A61M 60/829 |
| 2020/0030510 A1 | 1/2020 | Higgins | |
| 2020/0038569 A1 | 2/2020 | Sunagawa | |
| 2020/0405930 A1 * | 12/2020 | Zhang | A61M 60/816 |
| 2021/0015982 A1 | 1/2021 | Kerkhoffs et al. | |
| 2021/0038785 A1 | 2/2021 | Siess et al. | |
| 2021/0069392 A1 | 3/2021 | Muller et al. | |
| 2021/0106810 A1 | 4/2021 | Pfeffer et al. | |
| 2021/0275794 A1 | 9/2021 | Sunagawa | |
| 2021/0290164 A1 | 9/2021 | Linder et al. | |
| 2021/0322757 A1 | 10/2021 | D'Ambrosio et al. | |
| 2022/0134082 A1 | 5/2022 | Pfeffer et al. | |
| 2022/0167862 A1 | 6/2022 | Edelman | |

FOREIGN PATENT DOCUMENTS

| | | |
|---|---|---|
| EP | 3352808 B1 | 9/2023 |
| JP | 2015514531 A | 5/2015 |
| JP | 2018531645 A | 11/2018 |
| WO | 2011039091 A1 | 4/2011 |
| WO | 2014043650 A2 | 3/2014 |
| WO | 2018096531 A1 | 5/2018 |

* cited by examiner

PERCUTANEOUS CIRCULATORY SUPPORT DEVICE INCLUDING PROXIMAL PRESSURE SENSOR

CROSS REFERENCE TO RELATED APPLICATION

This application claims priority to Provisional Application No. 63/279,941, filed Nov. 16, 2021, and Provisional Application No. 63/390,054, filed Jul. 18, 2022, which are herein incorporated by reference in their entireties.

TECHNICAL FIELD

The present disclosure relates to percutaneous circulatory support systems. More specifically, the disclosure relates to percutaneous circulatory support devices that include one or more pressure sensors.

BACKGROUND

Percutaneous circulatory support devices can provide transient support for up to approximately several weeks in patients with compromised heart function or cardiac output. Some percutaneous circulatory support devices include one or more pressure sensors for measuring intravascular pressures. Measuring these pressures facilitates, for example, (1) detecting unintended device position changes within the heart, and (2) determining cardiac output, which in turn facilitates evaluation of potential treatment changes. However, devices including pressure sensors have several drawbacks. For example, the pressure sensors can be damaged during deployment. As another example, the sensed pressures may be inaccurate due to the operating speed of the device and other dynamic pressure effects. Accordingly, there is a need for improved devices that include pressure sensors.

SUMMARY

In an Example 1, a percutaneous circulatory support device comprises a housing; an impeller disposed within the housing, the impeller configured to rotate relative to the housing to cause blood to flow through the housing; a motor operably coupled to the impeller, the motor configured to rotate the impeller relative to the housing; a catheter coupled to the motor; and a pressure sensor coupled to the catheter and disposed proximally relative to the housing.

In an Example 2, the percutaneous circulatory support device of Example 1, further comprising a sensor housing comprising an internal chamber, the pressure sensor being disposed within the internal chamber.

In an Example 3, the percutaneous circulatory support device of Example 2, wherein the sensor housing comprises an aperture.

In an Example 4, the percutaneous circulatory support device of Example 3, wherein the aperture is a distally-facing aperture.

In an Example 5, the percutaneous circulatory support device of Example 3, wherein the aperture is a transversely-facing aperture.

In an Example 6, the percutaneous circulatory support device of Example 5, wherein the sensor housing further comprises a distally-facing aperture.

In an Example 7, the percutaneous circulatory support device of any of Examples 2-6, wherein the sensor housing comprises a ferrule.

In an Example 8, the percutaneous circulatory support device of any of Examples 2-7, further comprising an outer jacket securing the sensor housing and the pressure sensor to the catheter.

In an Example 9, the percutaneous circulatory support device of any of Examples 2-8, further comprising an adhesive securing the sensor housing and the pressure sensor to the catheter.

In an Example 10, the percutaneous circulatory support device of any of Examples 1-9, further comprising: a sensor cable coupled to the pressure sensor; and a cable lumen coupled to the catheter, the sensor cable being disposed in the cable lumen.

In an Example 11, the percutaneous circulatory support device of any of Examples 1-10, wherein the pressure sensor comprises one of an optical pressure sensor and an electrical pressure sensor.

In an Example 12, a percutaneous circulatory support system comprises: a support device, comprising: a housing; an impeller disposed within the housing, the impeller configured to rotate relative to the housing to cause blood to flow through the housing; a motor operably coupled to the impeller, the motor configured to rotate the impeller relative to the housing; a catheter coupled to the motor; a guidewire lumen coupled to the catheter; a sensing region; a guidewire, comprising: an elongated flexible body; and a pressure sensor coupled to the elongated flexible body; wherein the elongated flexible body is movable within the guidewire lumen to position the pressure sensor in the sensing region.

In an Example 13, the percutaneous circulatory support system of Example 12, further comprising a motor cable coupled to the motor, the motor cable being disposed within the catheter, and the guidewire lumen being disposed radially outwardly relative to the motor cable.

In an Example 14, the percutaneous circulatory support system of either of Examples 12-13, wherein the sensing region is disposed proximally relative to the motor.

In an Example 15, the percutaneous circulatory support system of any of Examples 12-14, further comprising an outer jacket coupling the guidewire lumen to the catheter.

In an Example 16, a percutaneous circulatory support device, comprises: a housing comprising an inlet and an outlet; an impeller disposed within the housing, the impeller configured to rotate relative to the housing to cause blood to flow into the inlet, through the housing, and out of the outlet; a motor operably coupled to the impeller, the motor configured to rotate the impeller relative to the housing; a catheter coupled to the motor; and a pressure sensor coupled to the catheter and disposed proximally relative to the housing.

In an Example 17, the percutaneous circulatory support device of Example 16, further comprising a sensor housing comprising an internal chamber, the pressure sensor being disposed within the internal chamber.

In an Example 18, the percutaneous circulatory support device of Example 17, wherein the sensor housing comprises an aperture.

In an Example 19, the percutaneous circulatory support device of Example 18, wherein the aperture is a distally-facing aperture.

In an Example 20, the percutaneous circulatory support device of Example 18, wherein the aperture is a transversely-facing aperture.

In an Example 21, the percutaneous circulatory support device of Example 20, wherein the sensor housing further comprises a distally-facing aperture.

In an Example 22, the percutaneous circulatory support device of Example 17, wherein the sensor housing comprises a ferrule.

In an Example 23, the percutaneous circulatory support device of Example 17, further comprising an outer jacket securing the sensor housing and the pressure sensor to the catheter.

In an Example 24, the percutaneous circulatory support device of Example 17, further comprising an adhesive securing the sensor housing and the pressure sensor to the catheter.

In an Example 25, the percutaneous circulatory support device of Example 16, further comprising: a sensor cable coupled to the pressure sensor; and a cable lumen coupled to the catheter, the sensor cable being disposed in the cable lumen.

In an Example 26, the percutaneous circulatory support device of Example 16, wherein the pressure sensor comprises one of an optical pressure sensor and an electrical pressure sensor.

In an Example 27, a percutaneous circulatory support system comprises: a support device, comprising: a housing comprising an inlet and an outlet; an impeller disposed within the housing, the impeller configured to rotate relative to the housing to cause blood to flow into the inlet, through the housing, and out of the outlet; a motor operably coupled to the impeller, the motor configured to rotate the impeller relative to the housing; a catheter coupled to the motor; a guidewire lumen coupled to the catheter; a sensing region; a guidewire, comprising: an elongated flexible body; and a pressure sensor coupled to the elongated flexible body; wherein the elongated flexible body is movable within the guidewire lumen to position the pressure sensor in the sensing region.

In an Example 28, the percutaneous circulatory support system of Example 27, further comprising a motor cable coupled to the motor, the motor cable being disposed within the catheter, and the guidewire lumen being disposed radially outwardly relative to the motor cable.

In an Example 29, the percutaneous circulatory support system of Example 27, wherein the sensing region is disposed proximally relative to the motor.

In an Example 30, the percutaneous circulatory support system of Example 27, further comprising an outer jacket coupling the guidewire lumen to the catheter.

In an Example 31, a method of manufacturing a percutaneous circulatory support device comprises: positioning an impeller within a housing such that the impeller is rotatable relative to the housing; operably coupling a motor to the impeller; coupling a catheter to the motor; and coupling a pressure sensor to the catheter proximally of the motor.

In an Example 32, the method of Example 31, wherein coupling the pressure sensor to the catheter comprises covering the catheter with an outer jacket.

In an Example 33, the method of Example 32, wherein covering the catheter with the outer jacket comprises forming the outer jacket on the catheter via a polymer reflow process.

In an Example 34, the method of Example 32, further comprising coupling a sensor cable to the pressure sensor.

In an Example 35, the method of Example 31, further comprising: positioning the pressure sensor within a sensor housing; and coupling the sensor housing to the catheter.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
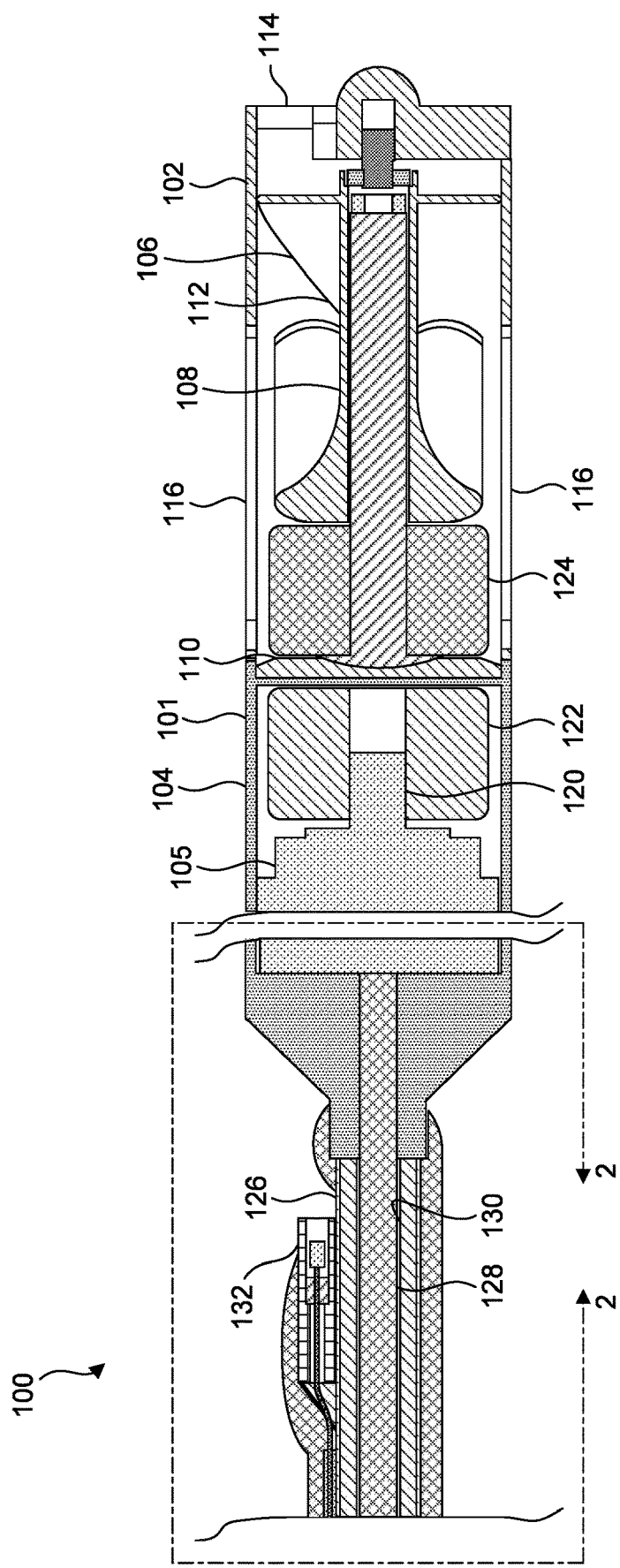
FIG. 1 is a side sectional view of an illustrative percutaneous circulatory support device (also referred to herein, interchangeably, as a "blood pump"), in accordance with embodiments of the subject matter disclosed herein.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 depicts a partial side sectional view of an illustrative percutaneous circulatory support device 100 (also referred to herein, interchangeably, as a "blood pump") in accordance with embodiments of the subject matter disclosed herein. The device 100 may form part of a percutaneous circulatory support system, together with a guidewire and an introducer sheath (not shown). More specifically, the guidewire and the introducer sheath may facilitate percutaneously delivering the device 100 to a target location within a patient, such as within the patient's heart. Alternatively, the device 100 may be delivered to a different target location within a patient.

With continued reference to FIG. 1, the device 100 generally includes a housing 101 that includes an impeller housing 102 and a motor housing 104. In some embodiments, the impeller housing 102 and the motor housing 104 may be integrally or monolithically constructed. In other embodiments, the impeller housing 102 and the motor housing 104 may be separate components configured to be removably or permanently coupled. In some embodiments, the blood pump 100 may lack a separate motor housing 104 and the impeller housing 102 may be coupled directly to the motor 105 described below, or the motor housing 104 may be integrally constructed with the motor 105 described below.

The impeller housing 102 carries an impeller assembly 106 therein. The impeller assembly 106 includes an impeller shaft 108 that is rotatably supported by at least one bearing, such as a bearing 110. The impeller assembly 106 also includes an impeller 112 that rotates relative to the impeller housing 102 to drive blood through the device 100. More specifically, the impeller 112 causes blood to flow from a blood inlet 114 (FIG. 1) formed on the impeller housing 102, through the impeller housing 102, and out of a blood outlet 116 formed on the impeller housing 102. In some embodiments and as illustrated, the impeller shaft 108 and the impeller 112 may be separate components, and in other embodiments the impeller shaft 108 and the impeller 112 may be integrated. In some embodiment and as illustrated, the inlet 114 and/or the outlet 116 may each include multiple apertures. In other embodiments, the inlet 114 and/or the outlet 116 may each include a single aperture. In some embodiments and as illustrated, the inlet 114 may be formed on an end portion of the impeller housing 102 and the outlet 116 may be formed on a side portion of the impeller housing 102. In other embodiments, the inlet 114 and/or the outlet 116 may be formed on other portions of the impeller housing 102. In some embodiments, the impeller housing 102 may couple to a distally extending cannula (not shown), and the cannula may receive and deliver blood to the inlet 114.

With continued reference to FIG. 1, the motor housing 104 carries a motor 105, and the motor 105 is configured to rotatably drive the impeller 112 relative to the impeller housing 102. In the illustrated embodiment, the motor 105 rotates a drive shaft 120, which is coupled to a driving magnet 122. Rotation of the driving magnet 122 causes rotation of a driven magnet 124, which is connected to and rotates together with the impeller assembly 106. More specifically, in embodiments incorporating the impeller shaft 108, the impeller shaft 108 and the impeller 112 are configured to rotate with the driven magnet 124. In other embodiments, the motor 105 may couple to the impeller assembly 106 via other components.

In some embodiments, a controller (not shown) may be operably coupled to the motor 105 and configured to control the motor 105. In some embodiments, the controller may be disposed within the motor housing 104. In other embodiments, the controller may be disposed outside of the motor housing 104 (for example, in an independent housing, etc.). In some embodiments, the controller may include multiple components, one or more of which may be disposed within the motor housing 104. According to embodiments, the controller may be, may include, or may be included in one or more Field Programmable Gate Arrays (FPGAs), one or more Programmable Logic Devices (PLDs), one or more Complex PLDs (CPLDs), one or more custom Application Specific Integrated Circuits (ASICs), one or more dedicated processors (e.g., microprocessors), one or more Central Processing Units (CPUs), software, hardware, firmware, or any combination of these and/or other components. Although the controller is referred to herein in the singular, the controller may be implemented in multiple instances, distributed across multiple computing devices, instantiated within multiple virtual machines, and/or the like. In other embodiments, the motor 105 may be controlled in other manners.

Figure 2:
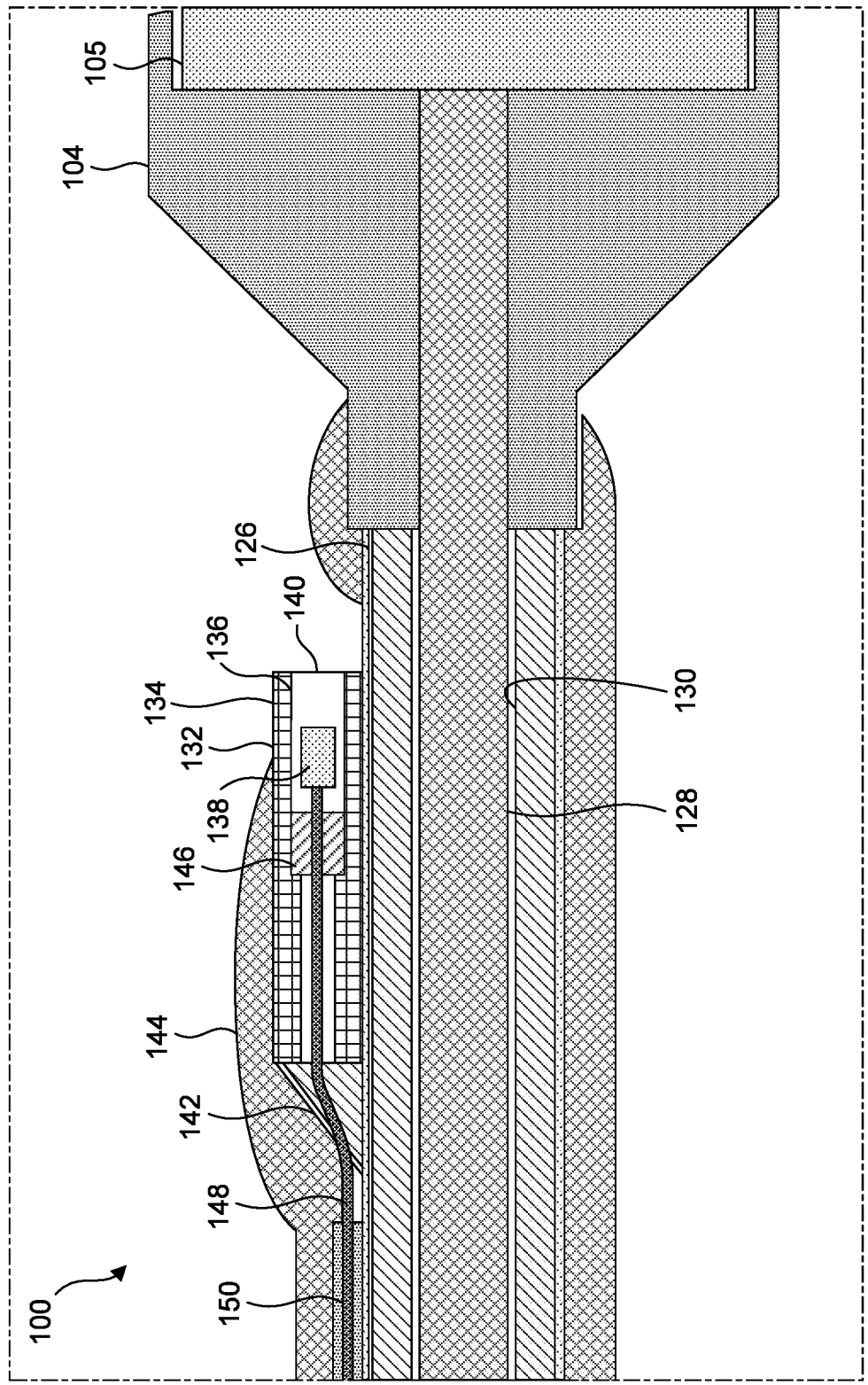
FIG. 2 is a detail view of the illustrative percutaneous circulatory support device within line 2-2 of FIG. 1.

With continued reference to FIG. 1 and additional reference to FIG. 2, the motor housing 104 couples to a catheter 126 opposite the impeller housing 102. The catheter 126 may couple to the motor housing 104 in various manners, such as laser welding, soldering, or the like. The catheter 126 extends proximally away from the motor housing 104. The catheter 126 carries a motor cable 128 within a main lumen 130, and the motor cable 128 may operably couple the motor 105 to the controller (not shown) and/or an external power source (not shown). Externally, the catheter 126 carries a sensor assembly 132 for measuring pressure within the vasculature of a patient, for example, within the aorta.

Advantageously, the sensor assembly 132 is positioned, relative to the other components of the device 100, in location for obtaining highly accurate pressure data. For example, the proximal position of the sensor assembly 132 relative to the motor housing 104 and the motor 105 reduces or eliminates the motor speed-related or dynamic pressure-related sensing inaccuracies. Such inaccuracies are typical of other percutaneous circulatory support devices that employ pressure sensors located more distally relative to the motor or impeller assembly, for example, devices that employ pressure sensors located near the outlet.

With specific reference to FIG. 2, the sensor assembly 132 includes a sensor housing 134 having a counterbore-shaped internal chamber 136. A pressure sensor 138, such as an optical or electrical pressure sensor, is disposed within the internal chamber 136. As such, the sensor housing 134 protects the pressure sensor 138 during deployment of the device 100. The sensor housing 134 also includes a distally-facing aperture 140 coupled to the internal chamber 136. The aperture 140 permits blood to enter the internal chamber 136, and the aperture 140 thereby permits the pressure sensor 138 to sense the pressure of the blood.

The sensor housing 134 may take various forms. For example, the sensor housing 134 may be a tube or ferrule manufactured from, for example, one or more metals, one or more plastics, composites, or the like. The sensor housing 134 may be coupled to the catheter 126 via one or more weldments (not shown), one or more adhesives 142, and/or an outer jacket 144 surrounding the sensor housing 134 and the catheter 126. The sensor housing 134 may also include a sensor mount 146 within the internal chamber 136. The sensor mount 146 facilitates supporting the pressure sensor 138 apart from the walls of the sensor housing 134 (that is, the sensor mount 146 centers the pressure sensor 138 within the internal chamber 136), which in turn facilitates high-accuracy pressure sensing.

With continued reference to FIG. 2, the sensor assembly 132 further includes a sensor cable 148 coupled to the pressure sensor 138. The sensor cable 148 may operably couple the pressure sensor to the controller (not shown). As illustrated, the sensor cable 148 may extend through the sensor mount 146 and support the pressure sensor 138 apart from the walls of the sensor housing 134. The sensor cable 148 extends proximally, through the adhesive 142, and through a cable lumen 150 coupled to the catheter 126. The cable lumen 150 may be coupled to the catheter 126 via one or more weldments (not shown), an adhesive (not shown), and/or the outer jacket 144. In other embodiments, the cable lumen 150 may be omitted, and the sensor cable 148 may extend through the main lumen 130 of the catheter 126 or lie directly under the outer jacket 144.

Figure 3:
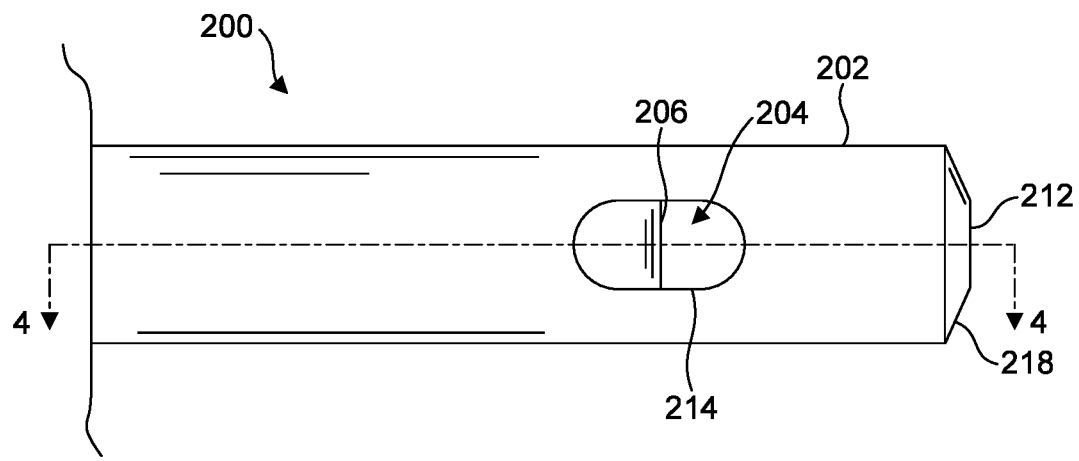
FIG. 3 is a side view of an illustrative sensor assembly of a percutaneous circulatory support device, in accordance with embodiments of the subject matter disclosed herein.
Figure 4:
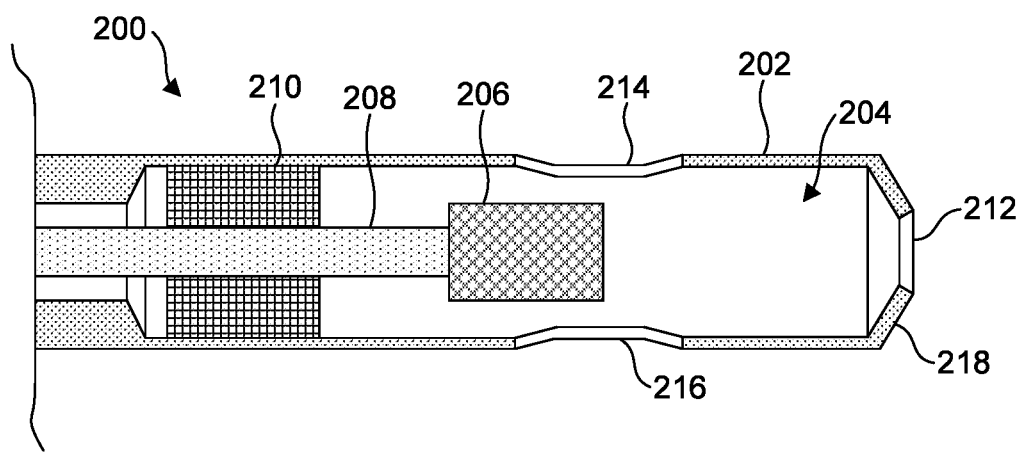
FIG. 4 is a side sectional view of the sensor assembly along line 4-4 of FIG. 3.

FIGS. 3 and 4 depict another sensor assembly 200 in accordance with embodiments of the subject matter disclosed herein. The sensor assembly 200 may be used part of the percutaneous circulatory support device 100 in place of the sensor assembly 132 described above. The sensor assembly 200 is similar to the sensor assembly 132 described above. More specifically, the sensor assembly 200 includes a sensor housing 202 that has an internal chamber 204, a pressure sensor 206, a sensor cable 208 (FIG. 4), and an optional sensor mount 210 (FIG. 4) which is disposed within the internal chamber 204. The sensor housing 202 also includes a plurality of apertures coupled to the internal chamber 204. More specifically, the sensor housing 202 includes a distally-facing aperture 212, a first transversely-facing aperture 214, and a second transversely-facing aperture 216 (FIG. 4). The plurality of apertures facilitate blood flow through the sensor housing 202 and thereby reduce thrombi formation. Alternatively, the sensor housing 202 could include a different number of apertures. For example, the sensor housing 202 could include one or more transversely-facing apertures and omit a distally-facing aperture. In any case, each of the apertures may be sized to inhibit the sensor 206 from passing therethrough, for example, if the sensor 206 detaches from the sensor cable 208 in use. The apertures may also have an oval shape, as shown in FIG. 3, or various other shapes.

In some embodiments and as illustrated in FIGS. 3 and 4, the distally-facing aperture 212 is formed by a tapering portion 218 of the sensor housing 202. The tapering portion 218 may be formed by crimping or coupling a separate piece of material to the remainder of the sensor housing 202. In other embodiments, the distally-facing aperture 212 can be a flat feature perpendicular to the axis of the internal chamber 204.

In some embodiments and as illustrated in FIGS. 3 and 4, the sensor 206 is at least partially aligned with the first transversely-facing aperture 214 and the second transversely-facing aperture 216. This position of the sensor 206 provides relatively little space within sensor housing 202 in which bubbles could form, which could reduce sensing accuracy. Alternatively, the sensor 206 may be disposed in other positions within the sensor housing 202. In some embodiments, the sensor 206 includes a surface energy-reducing coating (not shown), such as silicone, to inhibit bubble formation on the sensor 206 or within the sensor housing 202.

Figure 5:
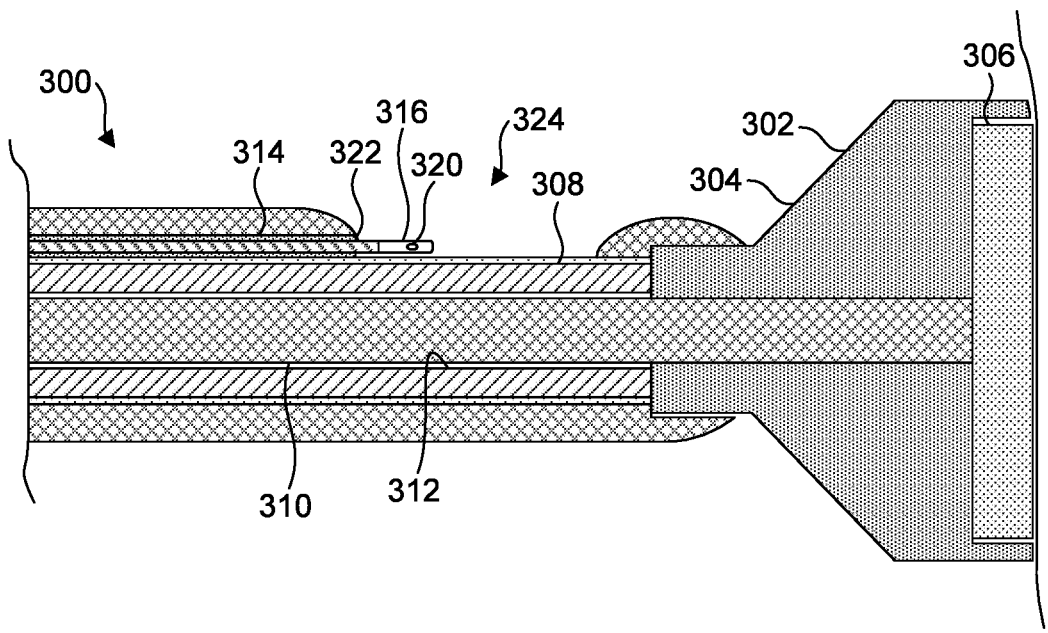
FIG. 5 is a side sectional view of an illustrative percutaneous circulatory support system, in accordance with embodiments of the subject matter disclosed herein.
Figure 6:
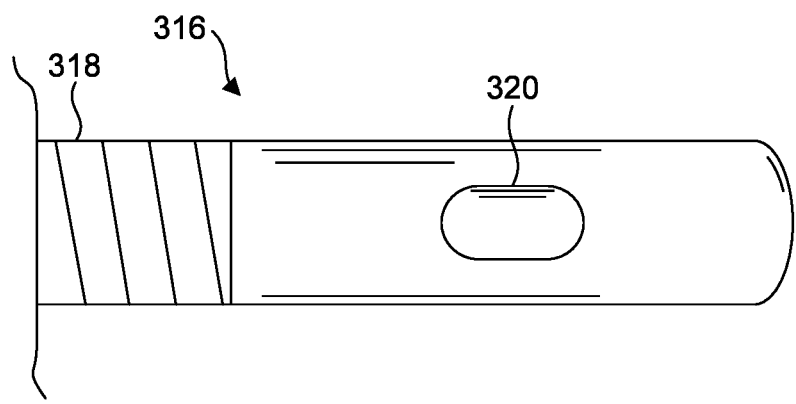
FIG. 6 is a side view of a pressure-sensing guidewire of the percutaneous circulatory support system of FIG. 5.

FIG. 5 depicts a partial side sectional view of an illustrative percutaneous circulatory support system 300 in accordance with embodiments of the subject matter disclosed herein. The system 300 includes a percutaneous circulatory support device 302 that is similar to the device 100 described above. More specifically, a distal portion (not shown) of the device 302 generally includes an impeller housing and an impeller, such as the impeller housing 102 and the impeller 112, respectively, described above and shown elsewhere. A proximal portion of the device 302 includes a motor housing 304 that carries a motor 306, and the motor housing 304 couples to a catheter 308 opposite the motor 306. The catheter 308 extends proximally away from the motor housing 304. The catheter 308 carries a motor cable 310 within a main lumen 312, and the motor cable 310 may operably couple the motor 306 to a controller (not shown) and/or an external power source (not shown). Externally, the catheter 308 carries a guidewire lumen 314 that receives a pressure-sensing guidewire 316. The pressure-sensing guidewire 316 may operably couple to the controller, and the guidewire 316 may take various specific forms. However, and with additional reference to FIG. 6, the pressure-sensing guidewire 316 generally includes an elongated flexible body 318 that carries a pressure sensor 320, such as an optical or electrical pressure sensor. The pressure-sensing guidewire 316 is advanced from a proximal end (not shown) of the guidewire lumen 314 to a distal end 322 of the guidewire lumen 314 (either before or after the device 302 is positioned in the vasculature of the patient). The sensor 320 extends distally from the guidewire lumen 314 and is positioned in a sensing region 324 of the catheter 308. The sensing region 324 is located proximally from the motor housing 304 and the motor 306, which, as described above, facilitates obtaining highly accurate pressure data. The guidewire 316 may additionally or alternatively sense pressure at various other locations relative to the catheter 308.

In other embodiments, the system 300 may take other forms or include additional components. For example, the device 302 may include a sensor housing, such as the sensor housing 134 or the sensor housing 202 described above and shown elsewhere, for receiving and protecting the pressure sensor 320 of the guidewire 316. Such a sensor housing may be coupled to the catheter 308 in various manners, including those described above in connection with the catheter 126 and the sensor housing 134 or the sensor housing 202. As another example, the guidewire 316 may be fixed relative to the catheter 126.

Figure 7:
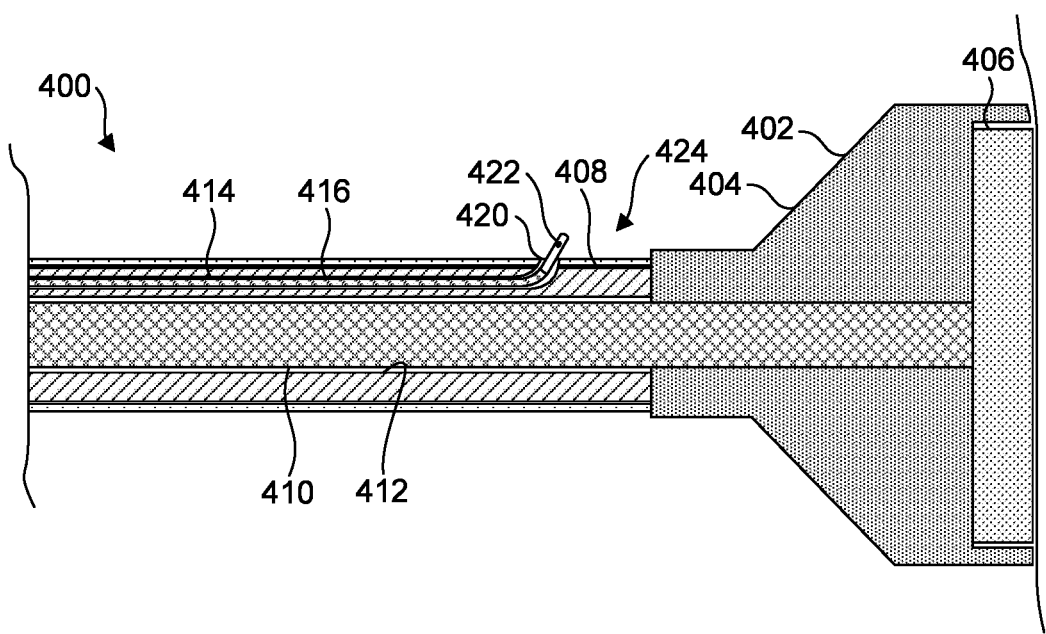
FIG. 7 is a side sectional view of an illustrative percutaneous circulatory support system, in accordance with embodiments of the subject matter disclosed herein.

FIG. 7 depicts a partial side sectional view of an illustrative percutaneous circulatory support system 400 in accordance with embodiments of the subject matter disclosed herein. The system 400 includes a percutaneous circulatory support device 402 that is similar to the device 100 described above. More specifically, a distal portion (not shown) of the device 402 generally includes an impeller housing and an impeller, such as the impeller housing 102 and the impeller 112, respectively, described above and shown elsewhere. A proximal portion of the device 402 includes a motor housing 404 that carries a motor 406, and the motor housing 404 couples to a catheter 408 opposite the motor 406. The catheter 408 extends proximally away from the motor housing 404. The catheter 408 is a dual lumen catheter. That is, the catheter 408 carries a motor cable 410 within a main lumen 412, and the motor cable 410 may operably couple the motor 406 to a controller (not shown) and/or an external power source (not shown). The catheter 408 also includes a guidewire lumen 414 that receives a pressure-sensing guidewire 416. The pressure-sensing guidewire 416 may operably couple to the controller, and the guidewire 416 may be similar to the pressure-sensing guidewire 316 (shown elsewhere). The pressure-sensing guidewire 416 is advanced from a proximal end (not shown) of the guidewire lumen 414 to a distal end 420 of the guidewire lumen 414 (either before or after the device 402 is positioned in the vasculature of the patient). A sensor 422 of the guidewire 416 extends distally from the guidewire lumen 414, through an opening at the distal end 420 of the guidewire lumen 414, and is positioned in a sensing region 424 of the catheter 408. The sensing region 424 is located proximally from the motor housing 404 and the motor 406, which, as described above, facilitates obtaining highly accurate pressure data. The guidewire 416 may additionally or alternatively sense pressure at various other locations relative to the catheter 408.

A method of manufacturing the percutaneous circulatory support device 100 may be as follows, and a method of manufacturing the device 302 may be similar. The impeller 112 is positioned within the impeller housing 102 such that the impeller 112 is rotatable relative to the impeller housing 102. The impeller 112 is operably coupled to the motor 105, and the catheter 126 is positioned adjacent to the motor housing 104. The cable lumen 150 is positioned adjacent to the catheter 126 and coupled to the catheter 126 via a process which may include forming the outer jacket 144 via at least one polymer reflow process. The pressure sensor 138 and the sensor cable 148 are then coupled to the sensor housing 134 such that the sensor 138 is positioned within the internal chamber 136 of the sensor housing 134. The sensor cable 148 is positioned in the cable lumen 150 and the sensor housing 134 and the pressure sensor within 138 are positioned adjacent to the catheter 126. The sensor housing 134 and the pressure sensor 138 within the sensor housing 134 are coupled to the catheter 126, for example, via one or more of welding, adhering, and covering the above components with the outer jacket 144. Covering these components with the outer jacket 144 may include forming the outer jacket 144 via a polymer reflow process.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A percutaneous circulatory support device, comprising:
    a housing comprising an inlet and an outlet;
    an impeller disposed within the housing, the impeller configured to rotate relative to the housing to cause blood to flow into the inlet, through the housing, and out of the outlet;
    a motor operably coupled to the impeller, the motor configured to rotate the impeller relative to the housing;
    a catheter coupled to the motor;
    a pressure sensor coupled to the catheter and disposed proximally relative to the motor; and
    a sensor housing comprising a wall covering a radially outward surface of the pressure sensor, the wall defining an internal chamber with a distally-facing aperture, the pressure sensor being disposed within the internal chamber.

2. The percutaneous circulatory support device of claim 1, wherein the sensor housing includes a sensor mount that spaces the pressure sensor apart from the wall defining the internal chamber, the pressure sensor being centered within the internal chamber.

3. The percutaneous circulatory support device of claim 2, further comprising an outer jacket securing the sensor housing and the pressure sensor to the catheter.

4. The percutaneous circulatory support device of claim 2, further comprising an adhesive securing the sensor housing and the pressure sensor to the catheter.

5. The percutaneous circulatory support device of claim 1, wherein the sensor housing further comprises a transversely-facing aperture.

6. The percutaneous circulatory support device of claim 1, further comprising:
    a sensor cable coupled to the pressure sensor; and
    a cable lumen coupled to the catheter, the sensor cable being disposed in the cable lumen.

7. The percutaneous circulatory support device of claim 1, wherein the pressure sensor comprises one of an optical pressure sensor and an electrical pressure sensor.

8. A method of manufacturing a percutaneous circulatory support device, the method comprising:
    positioning an impeller within a housing such that the impeller is rotatable relative to the housing;
    operably coupling a motor to the impeller;
    coupling a catheter to the motor such that the catheter extends proximal from the motor;
    coupling a pressure sensor housing to the catheter at a location proximal of the motor, the pressure sensor housing including a wall defining an internal chamber with a distally-facing aperture; and
    positioning a pressure sensor within the internal chamber of the pressure sensor housing such that the wall is positioned radially outward of and covering and entire length of the pressure sensor.

9. The method of claim 8, wherein coupling the pressure sensor to the catheter comprises covering the catheter with an outer jacket.

10. The method of claim 9, wherein covering the catheter with the outer jacket comprises forming the outer jacket on the catheter via a polymer reflow process.

11. The method of claim 9, further comprising coupling a sensor cable to the pressure sensor.

12. A percutaneous circulatory support device, comprising:
    a housing including a blood inlet and a blood outlet;
    an impeller disposed within the housing, the impeller configured to rotate relative to the housing to cause blood through the housing from the blood inlet to the blood outlet;
    a motor positioned proximal of the impeller and operably coupled to the impeller, the motor configured to rotate the impeller relative to the housing;
    a catheter coupled to the housing and extending proximally therefrom; and
    a pressure sensor disposed within a sensor housing coupled to the catheter and disposed proximally relative to both the housing and the motor, the sensor housing including a wall defining an internal chamber with a distally-facing aperture, wherein the pressure sensor is centered within the internal chamber with a part of the wall positioned radially outward of the pressure sensor, wherein the pressure sensor is positioned proximal of the blood outlet.

13. The percutaneous circulatory support device of claim 12, wherein the distally-facing aperture is interconnected with a transversely-facing aperture.